May 18, 1954
C. L. DIMMER
2,678,469
MATERIALS, ESPECIALLY SUITABLE FOR USE IN
FABRICATING PROSTHETIC APPLIANCES AND
DENTURES FABRICATED THEREFROM
Filed Aug. 10, 1951
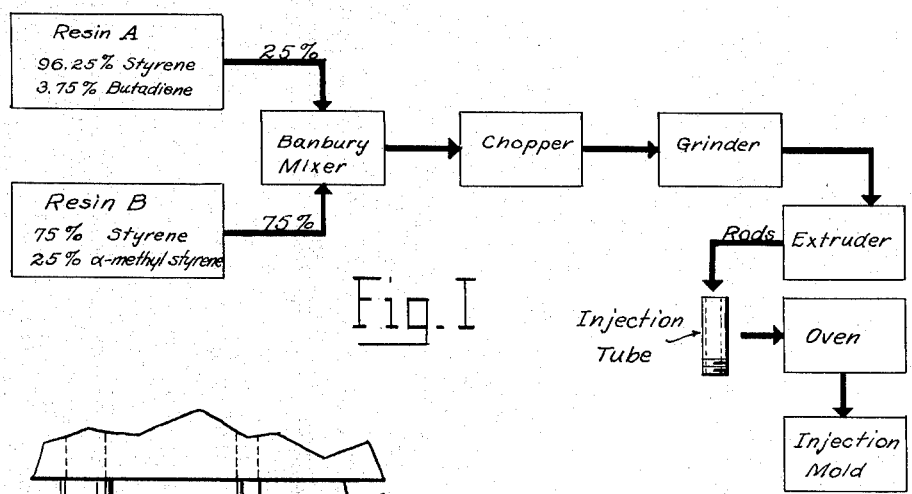
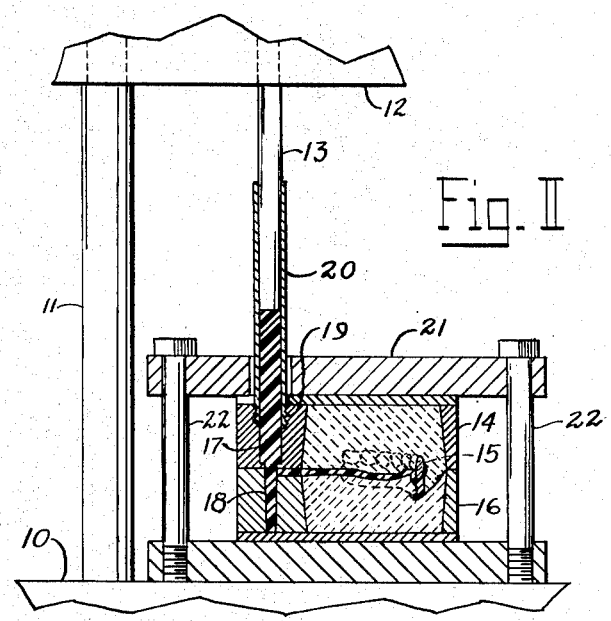
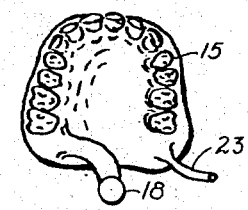
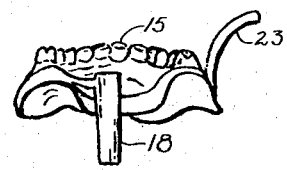
INVENTOR
*CHARLES L. DIMMER*
BY
*Owen & Owen*
ATTORNEYS

UNITED STATES PATENT OFFICE 2,678,469

MATERIALS ESPECIALLY SUITABLE FOR USE IN FABRICATING PROSTHETIC APPLIANCES AND DENTURES FABRICATED THEREFROM

Charles L. Dimmer, Toledo, Ohio

Application August 10, 1951, Serial No. 241,252

13 Claims. (Cl. 18—47.5)

This invention relates to improved synthetic resinous materials especially suitable for use in fabricating prosthetic appliances and to improvements in dentures fabricated from such improved materials which are especially compounded and handled to provide dentures having superior qualities.

Materials from which dentures are to be made must have many qualities, both physical and chemical, which are required because of the intimate bodily contact of the dentures and their exposure to all sorts of misuse and abuse, both in normal wear and in cleaning and storing.

In general the desired qualities of a good denture are that it fits the mouth of the wearer, is relatively light in weight, is long lasting, is tasteless, non-toxic and non-irritating to body tissues, and is not deleteriously affected by moisture and other substances entering the mouth of the wearer.

A poorly fitting denture is one of the most unfortunate afflictions borne by mankind; it subjects its wearer to embarrassment and pain; making it difficult to talk, to eat or to sleep. Plastics, or synthetic resins of one kind or another, molded by investment techniques to reproduce a wax pattern of the wearer's mouth, have quite well met the requirement for original good fit. Many plastics, however, are unsatisfactory because they will not accept coloring properly or may change color during the use of a denture made therefrom; may shrink, expand or change shape so the denture no longer fits; absorb water and crack or swell; be harmed by the alcohol in drinks or the acids in foods and saliva; be too weak to stand the repeated stresses and strains of chewing food; or, in cases where the plastics are molded from plasticized polymers, may release the plasticizer into the mouth where it attacks the tissue.

The extreme importance of all these qualities in dentures has led to exhaustive studies to determine the particular physical and chemical characteristics which must be present in denture material in order to predict and control the qualities of the finished dentures. The National Bureau of Standards of the U. S. Department of Commerce, in cooperation with the American Dental Association, has conducted exhaustive tests of so-called "standard" denture materials, such as, pink rubber, phenol-formaldehyde, methyl methacrylate, and others, the results of which have been included in its Circular C-433, "Physical Properties of Dental Materials." This publication reports testing systems and techniques that measure the characteristics of materials essential to the production of satisfactory dentures.

The physical and chemical characteristics of a material to be used for a denture are directly responsible, of course, for the properties of the finished denture. For example, how well the denture fits originally and how well it retains that fit depend, respectively, on the accuracy with which the material matches a mold, and its retention of such shape during curing or cooling in the mold, and upon its characteristics of shrinkage, water absorption and elongation subsequent to molding. The life of the denture depends upon the strength of the material as shown by transverse, impact and fatigue tests which demonstrate whether or not the denture will stand up under the stresses and strains to which it is exposed during mastication and cleaning.

Another important consideration in the fabrication of all types of prosthetic appliances which becomes more and more important as more and more teeth are replaced, is the vanity of the wearers. Persons who are required to wear false teeth are very sensitive about the subject and as a result a material to be successful must as closely as possible simulate the appearance of natural gums and must match their color. These requirements are met by materials having the proper dull sheen of moist gums and the delicate shading color of living tissue. The question of crazing away from the inset teeth also is important from the standpoint of vanity and the denture must not discolor or become odoriferous after wearing. Color stability, water absorption and resistance to the actions of alcohol (encountered in mixed drinks and beverages) and acids present in foods, are good indications of the properties of the dentures in this respect.

Still another very important quality which is highly desirable in materials for dentures is that of "thermal rigidity," which is the quality of retaining shape when subjected to elevated temperatures. In dentures this quality is required first, because of the many hot liquids which are taken into the mouth and second, in order to permit repair and rebuilding of old dentures. If a denture changes shape at temperatures of hot liquids or at temperatures where materials for its repair and rebuilding can be fused, it, of course, is not satisfactory. Many materials will withstand the temperatures of liquids taken into the mouth but only a few of the plastics which possess the other required characteristics can withstand the temperatures used for repair without too great a change in shape. Denture repairs are usually made at the temperature of boiling water so stability of form at 212° F. is a prime consideration.

It is the principal object of this invention to provide a material for the fabrication of dentures and other prosthetic appliances which is superior to the standards of the American Dental Association in all respects and is so compounded as to produce dentures of superior characteristics in appearance and use.

It is another object of this invention to provide a compounded synthetic resinous denture material having superior characteristics for denture molding in which the compounding gives the final material qualities not present in the original non-compounded base resins and that are peculiarly advantageous in dentures.

It is a more specific object of this invention to provide a material for the low pressure injection molding of dentures and dentures molded therefrom, which have superior stability of form, good color and color retention, excellent appearance, and superior fit and which retain their superior characteristics and properties over long periods of service.

The invention consists in a thermoplastic material homogeneously admixed from two different styrene resins, the superior qualities of the final compound being particularly effective for use in injection molding of dentures, in the process of so combining the resins, and in dentures molded from such material.

The practice of the invention involves the physical manipulation of the two styrene copolymers in certain preferred proportions in order to thoroughly and completely admix the two; their formation into slugs for low pressure injection molding by a process particularly designed for the fabrication of dentures; and the molding of the material in investment molds for the actual production of the dentures.

Figure I of the drawings is a flow chart of the compounding process used for mixing the two resins in their optimum ratio to produce a homogeneous preform or slug; and its subsequent use.

Figure II is a somewhat diagrammatic drawing in vertical section showing the investment mold and the formation of the actual denture.

Figure III is a plan view of a molded denture just after removal of the investment material therefrom.

Figure IV is a view in elevation of the denture shown in Figure III.

I have discovered that a superior molding material for dentures and dentures having especially good qualities can be made by compounding two selected styrene copolymers in selected proportions, preferably of about 1 to 3, although variations in the ratio, within certain limited ranges, can also be used; 1 to 3 being an optimum ratio. A mixture consisting of 25% by weight of a polymerized solid styrene copolymer (A) consisting in about 96–96.5% by weight of styrene and about 3.5–4% by weight of butadiene and 75% by weight of a second solid copolymer (B) consisting of about 75% by weight of styrene and about 25% by weight of alpha-methyl styrene, can be blended into a heterogeneous composition which can be injection molded at low pressures in investment molds and will produce dentures of superior qualities. The selected styrene copolymers have the following physical characteristics:

Table I

| Property | ASTM Test Method | Resin A | Resin B |
| --- | --- | --- | --- |
| Tensile Strength, 1/8" bar, p. s. i. | D638–46T | 3,500–5,000 | 6,500–7,500 |
| Elongation, percent | D638–46T | 18–25 | 1.6–2.3 |
| Modulus in Tension, × 10⁵ p. s. i. | D638–46T | 3.3–3.8 | 4.5–4.8 |
| Impact Strength: | | | |
| Izod notched, 1/8" bar, ft. lbs./in. of notch | D256–47T | 1.0–1.5 | 0.2–0.6 |
| Izod unnotched, 1/8" bar, ft. lbs./in. of width | | 9–16 | 2–6 |
| Heat Distortion, 1/8" bar, °F | D648–45T | 155–163 | 182–189 |
| Rockwell Hardness | D785–48T | L70–80 | M68–80 |
| Specific Gravity | D792–48T | 1.04–1.06 | 1.05–1.07 |

A typical example of the blending of the two resins into a homogeneous material suitable for injection molding by my technique will be illustrative. A 78 pound charge, consisting of the two resins A and B, in granular form and in the proportions of 1 to 3 by weight, is placed in a Banbury mixer. Coloring materials preferably are also placed in the mixer along with the charge of resins. Care must be taken that none of the pigments are toxic and that they are such as will blend throughout the plastic. For example, pigments such as mixtures of titanium dioxide and varying shades of cadmium red, blended in proportions to result in the desired natural color may be used. The charge is kneaded in the Banbury mixer until the two resins are homogeneously intermixed, say for a period of 10 minutes while the Banbury is heated by circulating steam in the jacket at 120 pounds per square inch. The homogeneous mass is then run through a chopper where it is cut into squares and then the squares are run through a grinder and turned into random sized granules. The granules are then charged in a high pressure extruding machine having a fine screening head and extruded in rods, say, 5/8 inch in diameter, and rods are cut off at six inch lengths. A slug or preform of this size contains approximately the correct amount of resin for the molding of a single denture and is of a size convenient to store, handle and mold. The rods, when examined carefully for discolorations, blow holes or air pockets, are found to be entirely homogeneous in appearance and to give no indication that they are compounded from two different resinous materials.

In molding a denture from a slug or preform so compounded, the apparatus disclosed in Figure II may be employed. This apparatus consists in a base 10 on which is erected an upright column 11 holding a head 12 in which there is mounted a vertically movable ram 13. The ram 13 may be actuated by hydraulic or other mechanism (not shown) at a pressure of as low as about 500 pounds per square inch.

An investment mold, indicated generally by the reference character 14 is prepared, in the manner well known in the art, by pouring the investment material around a wax pattern in which there are inset the required number of artificial teeth 15 of size, shape and color selected for the particular patient. The investment mold is cast in a metal mold box 16 which has upper and lower halves and which is bored to form an inlet 17 and a sprue hole 18. The mold box 16 has a threaded opening 19 concentric with the inlet 17 for the reception of an injection tube 20 into which the ram 13 can be forced to inject resin into the mold.

As the first step in producing a denture in the mold the investment material is poured in the lower half of the mold box and the wax pattern set in its surface while the material is fluid. The top half of the box (with its cover removed) is then assembled to the lower half. Wax leads are placed between the wax pattern and the sprue opening 18 and between the wax pattern at its most distant point and an outlet opening in the wall of the box. The investment material is then poured into the top half of the mold box and the cover put in place. After the investment sets, the wax pattern is melted out by placing the box in boiling water, leaving the teeth retained in position as inserts in the mold formed by the hardened investment material.

After the mold is formed around the wax pattern and the wax removed, the mold box is clamped in place by a locking plate 21 and bolts 22.

The slug or preform of molding compound is placed in one of the injection tubes 20 and the tube containing the preform is heated in an oven for a period of twenty minutes at a temperature of between 395° and 420° F. At this point the resin composition has just started to become plastic and is in condition for injection. The injection tube 20, containing the softened plastic composition is then screwed into the threaded opening 19 and the ram 13 inserted in the upper end of the tube. The press forces the ram downwardly extruding the composition first into the sprue opening 18 and then through the inlet into the mold where it flows throughout the mold cavity, closely surrounding the artificial teeth and forming the denture, finally being squeezed out the outlet where its appearance indicates that the mold cavity is filled.

After the compound has cooled, the investment material is cut away and the molded denture, including the inlet sprue formed in the cavity 18 and an outlet sprue 23, has the form shown in Figures III and IV. The two sprues are dressed off the denture leaving a finished article which perfectly reproduces the wax pattern molded from the patient's mouth.

A denture so produced from my new composition has superior characteristics as is demonstrated by the results of tests conducted according to the standards established as mentioned above. These tests are performed on prescribed pieces of the material molded in standard molding cycles into test bars of specified sizes.

A test bar .080 inch thick, 2½ inches long, and shaped generally like the letter T, with a tapering vertical bar, is clamped by the lower end of the vertical bar, in a stationary clamp. The cross bar is subjected to repeated deflections and a count is kept to determine whether the bar breaks under the flexures. The standard established for denture materials is that such a bar, under a force of 2000 p. s. i. shall withstand a minimum of 200,000 cycles without fracture. Each of ten test bars, fabricated from my new compound was tested and after 10,000,000 cycles, each was completely free of any cracks or indications of impending fracture. Under a force of 2500 p. s. i. the ten test bars of my new material also underwent 10,000,000 cycles without fractures. The great flexural strength of my new material as evidenced by these tests, clearly indicates a long life under the flexural distortions to which dentures are subjected in normal usage.

A good demonstration of stability of form and retention of fit of dentures made from my new compound is afforded by transverse deflection tests made in accordance with the specifications set up by the American Dental Association. For these tests, test bars were molded from my compound which were 10 mm. wide, 2.5 mm. thick and 65 mm. long. In the test, the bar is supported near its ends by a pair of rollers which are spaced 50 mm. apart. A test load is applied by a plunger acting downwardly at the center point of the bar and the deflection in mm. is measured for various loadings in grams.

The American Dental Association standards for denture materials are as follows:

| Load | Deflection |
| --- | --- |
| 4,000 gm | 2.6 mm. maximum. |
| 6,000 gm | 3. mm. minimum. |
| 6,000 gm | 8. mm. maximum. |

These minimum and maximum figures reflect the desirable properties of elongation and stability which must be properly balanced. For example, if the material does not deflect enough, it means that the material is too rigid, will crack if dropped and will not withstand the changes in dimension which occur during molding, curing, and subsequent wearing. If, on the other hand, the material deflects too much, it will result in dentures that fail to hold their shape during usage.

Ten test bars of my new material were tested at room temperature (74° F.) to determine their properties with the following results:

| Load in grams | 2,000 | 3,000 | 4,000 | 5,000 | 6,000 | 7,000 |
| --- | --- | --- | --- | --- | --- | --- |
| Average deflection in mm | .32 | .98 | 1.67 | 2.46 | 3.43 | 4.76 |

Ten identical bars were then tested in wet condition and in a chamber having a constant temperature of 98.6° F. (normal mouth temperature) in accordance with American Dental Association standards, with the following results:

| Load in grams | 2,000 | 3,000 | 4,000 | 5,000 | 6,000 | 7,000 |
| --- | --- | --- | --- | --- | --- | --- |
| Average deflection in mm | .34 | .99 | 1.64 | 2.39 | 3.28 | 4.60 |

The deflections of 1.67 mm. (dry at 74° F.) and 1.64 mm. (wet at 98.6° F.) at 4000 grams load, compare very favorably with the American Dental Association's maximum of 2.6 mm. for 4000 grams loading; and the deflections of 3.43 mm. (dry at 74° F.) and 3.28 mm. (wet at 98.6 F.) also compare favorably with the American Dental Association's minimum of 3 mm. for 6000 grams loading. None of my test pieces failed under loads of 8000 grams.

The impact strength of my new material also is superior to American Dental Association standards. Test standards specify test bars similar to those used in deflection tests but ¼ inch thick instead of 2.5 mm. thick. My new compound has a tested impact strength of 19.5 cm. kg./cm.$^2$ which is much higher than those recorded for standard denture materials by the Bureau of Standards.

The quality of thermal rigidity is tested by placing a bar molded from the denture material which is 10 mm. wide, 65 mm. long and one-quarter inch thick, in the same machine by means of which the deflection tests are made. In the thermal rigidity test the machine is loaded with 1000 grams of weight and the loaded bar is immersed in an oil bath. The temperature of the oil bath is raised from room temperature (74° F.) at a rate of approximately 3° F. per minute. The deflection of the bar is measured by a dial gauge and the test results are the temperatures at which the bar deflects .01 inch and .1 inch.

Test bars molded from my new composition and subjected to the thermal rigidity test as outlined, deflect a distance of .01 inch at an average temperature of 217° F. and a distance of .1 inch at an average temperature of 233° F. These test results show my material to be highly acceptable and capable of withstanding repair and rebuilding at the normal temperature for such work, i. e., 212° F.

Equally important in dentures is the property defined as "elongation" which is determined by measuring the extension of a test bar subjected to an increasing load under a constant temperature. In this test, bars 150 mm. long, 7.5 mm. wide and 3 mm. thick and having a centrally located narrow section 60 mm. long, but only 6 mm. wide are subjected to increases in tension at a rate of 10 pounds per minute, at a constant room temperature. The percentage of elongation is an expression of the relative increase in length at which the bar fractured. Bars molded from my composition in its preferred 1 to 3 ratio have 17% elongation before fracture.

Another highly important quality of my new dental composition is its extremely low water absorption. Test discs molded from my material and immersed in water for 24 hours at 98° F. show an increase in weight of only .044%. Dentures molded from my material have, therefore, exceptionally fine shape retaining properties and need not originally be smaller than the jaw in order to prevent their shortly becoming too large because of expansion caused by water absorption while in the mouth. The practice of leaving dentures in a glass of water over night increases the need for a denture material having low water absorption.

While the precise ratio of 1 to 3 parts by weight of the resins described above is a preferred ratio for my new denture material, inasmuch as it strikes a balance between physical properties most useful and advantageous, the exact ratio can be varied somewhat and the resulting compositions still will possess superior qualities for denture purposes. Such variations in ratio are, however, limited on one side by the thermal rigidity required of the finished cured material since it is essential that it remain constant in size at the temperature of boiling water at which most denture repair is performed; and, on the other by the required elongation before fracture.

A composition was made in a ratio of 40% by weight of resin A (about 96¼% styrene and about 3¾% butadiene) and 60% by weight of resin B (75% styrene and 25% alpha-methyl styrene) and tested in the manner set forth above for its thermal rigidity. The several tests showed a distortion of .01 inch at an average temperature of 212° F. which is the minimum satisfactory for dental repairs.

Another test batch, made in a ratio of 20% by weight of resin A and 80% by weight of resin B was compounded in the manner explained above and found to be satisfactory from the standpoint of thermal rigidity but at the edge of the limit as to percentage of elongation before fracture. Preferably, the amount of resin A used is from 22 to 28 per cent by weight and the amount of resin B from 72 to 78 per cent by weight, as optimum characteristics in the finished material are so obtained.

With these limitations in ratio dictated by the requirements of thermal rigidity and elongation, my new composition, prepared in accordance with my process as explained and molded by the technique set forth, forms dentures exhibiting properties and characteristics superior in every pertinent category to dentures molded from any previously known material. Such dentures fit perfectly when first molded; have good color which remains substantially stable for periods indicated by accelerated laboratory tests to be as long as 5 to 7 years and change in color by becoming lighter, in contrast to the darkening changes of many denture materials; retain their shape and size during use; and not easily damaged even by accidents such as dropping; and can easily be modified or repaired (as by having a broken tooth replaced) without distortion.

I have found that not only is the ratio of the materials critical within the range set forth, with the optimum indicated; but the process of blending is believed of some importance, since, as is well known, variations in mixing and molding processes produce unpredictable changes in such characteristics as uniformity of cure, dimensional stability, etc. of resins which, in turn, may deleteriously affect dentures produced therefrom.

This application is a continuation in part of my application Ser. No. 178,228, filed August 8, 1950, now abandoned.

Having described my invention, I claim:

1. A denture comprising a body consisting of a homogeneous mixture of from 20 to 40 parts by weight of a copolymer of 96.0 to 96.5 per cent by weight of styrene and 3.5 to 4. per cent by weight of butadiene having the physical properties set forth for resin A in Table I hereof and of from 80 to 60 parts by weight of a copolymer of about 75 per cent by weight of styrene and about 25 per cent by weight of alpha-methyl styrene, having physical properties as set forth for resin B in Table I hereof.

2. A denture comprising a body consisting of a homogeneous mixture of 1 part by weight of a copolymer of 96.0–96.5 per cent by weight of styrene and 3.5 to 4. per cent by weight of butadiene having the physical properties set forth for resin A in Table I hereof and 3 parts by weight of a copolymer of about 75 per cent by weight of styrene and about 25 per cent by weight of alpha-methyl styrene, having physical properties as set forth for resin B in Table I hereof.

3. A material for the injection molding of dentures at pressures of about 500 pounds per square inch, consisting of a homogeneous mixture of from 20 to 40 parts by weight of a copolymer of 96.0 to 96.5 per cent by weight of styrene, and 3.5 to 4. per cent by weight of butadiene having the physical properties set forth for resin A in Table I hereof and of from 80 to 60 parts by weight of a copolymer of about 75 per cent by weight of styrene and about 25 per cent by weight of alpha-methyl styrene, having physical properties as set forth for resin B in Table I hereof.

4. A material for the injection molding of dentures at pressures of about 500 pounds per square inch, consisting of a homogeneous mixture of 1 part by weight of a copolymer of about 96¼ per cent by weight of styrene and about 3¾ per cent by weight of butadiene having the physical properties set forth for resin A in Table I hereof and 3 parts by weight of a copolymer of about 75 per cent by weight of styrene and about 25 per cent by weight of alpha-methyl styrene, having physical properties as set forth for resin B in Table I hereof.

5. A method of homogeneously compounding a copolymer of 96.0 to 96.5 per cent by weight of styrene and 3.5 to 4. per cent by weight of butadiene having the physical properties set forth for resin A in Table I hereof with a copolymer of about 75 per cent by weight of styrene and about 25 per cent by weight of alpha-methyl styrene having physical properties as set forth for resin B in Table I hereof for injection molding under pressures of about 500 pounds per square inch, that comprises the steps of blending the two copolymers in proportions of from 20 to 40 parts by weight of the first named copolymer with from 80 to 60 parts by weight of the second named copolymer for a period of about 10 minutes at a temperature of about 340° F., cubing the blended mass, granulating the cubes, and compacting the granules into slugs of solid homogeneous composition.

6. A denture comprising a body consisting of a homogeneous mixture of from 20 to 40 parts by weight of a copolymer of 96.25 per cent by weight of styrene and 3.75 per cent by weight of butadiene having the physical properties set forth for resin A in Table I hereof and of from 80 to 60 parts by weight of a copolymer of 75 per cent by weight of styrene and 25 per cent by weight of alpha-methyl styrene, having physical properties as set forth for resin B in Table I hereof.

7. A denture comprising a body consisting of a homogeneous mixture of 1 part by weight of a copolymer of 96.25 per cent by weight of styrene and 3.75 per cent by weight of butadiene having the physical properties set forth for resin A in Table I hereof and 3 parts by weight of a copolymer of 75 per cent by weight of styrene and 25 per cent by weight of alpha-methyl styrene, having physical properties as set forth for resin B in Table I hereof.

8. A material for the injection molding of dentures at pressures of about 500 pounds per square inch, consisting of a homogeneous mixture of from 20 to 40 parts by weight of a copolymer of 96.25 per cent by weight of styrene and 3.75 per cent by weight of butadiene having the physical properties set forth for resin A in Table I hereof and of from 80 to 60 parts by weight of a copolymer of 75 per cent by weight of styrene and 25 per cent by weight of alpha-methyl styrene, having physical properties as set forth for resin B in Table I hereof.

9. A material for the injection molding of dentures at pressures of about 500 pounds per square inch, consisting of a homogeneous mixture of 1 part by weight of a copolymer of 96.25 per cent by weight of styrene and 3.75 per cent by weight of butadiene having the physical properties set forth for resin A in Table I hereof and 3 parts by weight of a copolymer of 75 per cent by weight of styrene and 25 per cent by weight of alpha-methyl styrene, having physical properties as set forth for resin B in Table I hereof.

10. A denture comprising a body consisting of a homogeneous mixture of from 22 to 28 parts by weight of a copolymer of 96.0 to 96.5 per cent by weight of styrene and 3.5 to 4. per cent by weight of butadiene having the physical properties set forth for resin A in Table I hereof and of from 78 to 72 parts by weight of a copolymer of about 75 per cent by weight of styrene and about 25 per cent by weight of alpha-methyl styrene, having physical properties as set forth for resin B in Table I hereof.

11. A material for the injection molding of dentures at pressures of about 500 pounds per square inch, consisting of a homogeneous mixture of from 22 to 28 parts by weight of a copolymer of 96.0 to 96.5 per cent by weight of styrene and 3.5 to 4. per cent by weight of butadiene having the physical properties set forth for resin A in Table I hereof and of from 78 to 72 parts by weight of a copolymer of about 75 per cent by weight of styrene and about 25 per cent by weight of alpha-methyl styrene, having physical properties as set forth for resin B in Table I hereof.

12. A denture comprising a body consisting of a homogeneous mixture of from 22 to 28 parts by weight of a copolymer of 96.25 per cent by weight of styrene and 3.75 per cent by weight of butadiene having the physical properties set forth for resin A in Table I hereof and of from 78 to 72 parts by weight of a copolymer of 75 per cent by weight of styrene and 25 per cent by weight of alpha-methyl styrene, having physical properties as set forth for resin B in Table I hereof.

13. A material for the injection molding of dentures at pressures of about 500 pounds per square inch, consisting of a homogeneous mixture of from 22 to 28 parts by weight of a copolymer of 96.25 per cent by weight of styrene and 3.75 per cent by weight of butadiene having the physical properties set forth for resin A in Table I hereof and of from 78 to 72 parts by weight of a copolymer of 75 per cent by weight of styrene and 25 per cent by weight of alpha-methyl styrene, having physical properties as set forth for resin B in Table I hereof.

References Cited in the file of this patent

UNITED STATES PATENTS

| Number | Name | Date |
| --- | --- | --- |
| 1,533,625 | Williams | Apr. 14, 1925 |
| 2,056,796 | Macht | Oct. 6, 1936 |
| 2,338,607 | Wacker | Jan. 4, 1944 |
| 2,526,654 | Gleason et al. | Oct. 24, 1950 |
| 2,556,459 | Wesp | June 12, 1951 |

FOREIGN PATENTS

| Number | Country | Date |
| --- | --- | --- |
| 422,232 | Great Britain | Jan. 8, 1935 |